(12) United States Patent
Jiang Häfner

(10) Patent No.: US 8,971,070 B2
(45) Date of Patent: Mar. 3, 2015

(54) INTERFACE ARRANGEMENT BETWEEN AC AND DC SYSTEMS FOR RELIABLE OPENING OF THE CIRCUIT BREAKER IN TIME

(75) Inventor: Ying Jiang Häfner, Ludvika (SE)

(73) Assignee: ABB Technology AG, Zürich (CH)

( * ) Notice: Subject to any disclaimer, the term of this patent is extended or adjusted under 35 U.S.C. 154(b) by 0 days.

(21) Appl. No.: 14/354,431

(22) PCT Filed: Oct. 27, 2011

(86) PCT No.: PCT/EP2011/068834
§ 371 (c)(1),
(2), (4) Date: Apr. 25, 2014

(87) PCT Pub. No.: WO2013/060368
PCT Pub. Date: May 2, 2013

(65) Prior Publication Data
US 2014/0268942 A1 Sep. 18, 2014

(51) Int. Cl.
*H02H 7/125* (2006.01)
*H02J 3/36* (2006.01)

(52) U.S. Cl.
CPC .............. *H02H 7/1255* (2013.01); *H02J 3/36* (2013.01); *Y02E 60/60* (2013.01)
USPC ........................................................ 363/53

(58) Field of Classification Search
USPC .............................. 363/53, 56.02, 56.04, 56.05
See application file for complete search history.

(56) References Cited

U.S. PATENT DOCUMENTS

| | | | |
|---|---|---|---|
| 3,898,533 A | | 8/1975 | Scudner, Jr. |
| 4,912,589 A | * | 3/1990 | Stolarczyk ..................... 361/56 |
| 6,411,529 B1 | | 6/2002 | Svensson |
| 2010/0019876 A1 | * | 1/2010 | Owen ........................... 336/170 |
| 2010/0085785 A1 | * | 4/2010 | Dommaschk et al. .......... 363/53 |

FOREIGN PATENT DOCUMENTS

| | | |
|---|---|---|
| CN | 201839013 U | 5/2011 |
| WO | WO 2010/149217 A1 | 12/2010 |

OTHER PUBLICATIONS

Saied et al., "Optimal Design of AC Filter Circuits in HVDC Converter Stations", Industry Applications Conference, 1995, Thirtieth IAS Annual Meeting, IAS '95, Conference Record of the 1995 IEEE, Orlando, FL, Oct. 8-12, 1995, New York, NY, USA, IEEE, vol. 3, Oct. 8, 1995, pp. 2213-2218, XP010193343, DOI: 10.1109/IAS.1995. 530584 ISBN: 978-0-7803-3008-5, figure 4.

* cited by examiner

*Primary Examiner* — Jue Zhang
(74) *Attorney, Agent, or Firm* — Birch, Stewart, Kolasch & Birch, LLP

(57) ABSTRACT

An interface arrangement for coupling between an AC system and a DC system. The arrangement includes a converter for conversion between AC and DC and having a DC side with a first and a second terminal for connection to the DC system and an AC side with a group of terminals for being coupled to the AC system, a transformer having a primary side with a first set of primary windings for being coupled to the AC system and a secondary side with a second set of secondary windings coupled to the converter, where the transformer is equipped with a third set of auxiliary windings and a short-circuiting device is connected between the third set of auxiliary windings and ground.

22 Claims, 2 Drawing Sheets

_US 8,971,070 B2_

INTERFACE ARRANGEMENT BETWEEN AC AND DC SYSTEMS FOR RELIABLE OPENING OF THE CIRCUIT BREAKER IN TIME

FIELD OF THE INVENTION

The present invention generally relates to power transmission systems. More particularly the present invention relates to an interface arrangement for coupling between an AC system and a DC system.

BACKGROUND

Interface arrangements are known to be connected between an Alternating Current (AC) system, often denoted AC grid and a Direct Current (DC) system, like a High Voltage Direct Current (HVDC) system. Such an arrangement typically includes a converter, such as a voltage source converter, for conversion between AC and DC and having a DC side connected to the DC system and an AC side for coupling to the AC system. The arrangement also often includes a transformer having a primary side connected to the AC system and a secondary side for coupling to the converter. There is also an AC breaker between the primary windings of the transformer and the AC system in order to protect the converter through isolating the converter station from the AC system. The transformer may furthermore comprise auxiliary windings, which may be used for power supply, for instance of a plant or converter station where the interface arrangement is provided. Such power may be used in the powering of the plant such as the powering of cooling equipment for cooling the components of the converter.

In relation to a converter, which may be a cell-based multilevel converter, there may occur a number of faults that need to be taken care of.

One type of fault is an overvoltage on an AC bus between the converter and the transformer. Such a fault may be handled through providing surge arresters, for instance between the AC bus and ground.

In cell-based multilevel converters this solution is difficult to implement because of the use of cells.

Furthermore, the opening of the AC breaker for instance for isolating the interface arrangement from the AC system, may sometimes fail because the AC current may contain too high a DC component and thereby the current between the converter and the AC system may lack zero-crossings, which makes the AC breaker impossible to open.

One destructive overvoltage on the phase arms can be caused by a single-phase-to-ground fault at between the transformer and an AC terminal of the converter.

It is also possible that a DC pole to ground fault may occur, which can cause high currents to flow in diodes of the converter.

There exist some solutions for handling such faults.

WO 2010149217 does for instance describe a method for protecting a transformer at single-phase-to-ground faults. According to the document, when a ground fault is detected the ungrounded neutral on the secondary side of a transformer is connected to ground. In this way overvoltages on the secondary side can be reduced while coping with arresters having lower requirements and fast switching devices.

U.S. Pat. No. 6,411,529 describes a power plant control system in which rectifying diodes are replaced with controllable semiconductors. Because of this the reverse currents through the diodes due to faults can be blocked by controlling the controllable semiconductors.

There is therefore a need for an improvement in handling the above mentioned type of faults, especially in cell based multilevel voltage source converters.

SUMMARY OF THE INVENTION

The present invention addresses this situation. The invention is thus directed towards improving fault handling of an interface arrangement.

This is according to one aspect of the invention achieved through an interface arrangement for coupling between an AC system and a DC system and comprising:

a converter for conversion between AC and DC, said converter having a DC side with a first and a second terminal for connection to said DC system and an AC side with a group of terminals for being coupled to said AC system, a transformer having a primary side with a first set of primary windings for being coupled to said AC system and a secondary side with a second set of secondary windings coupled to said converter, said transformer being equipped with a third set of auxiliary windings, and a short-circuiting device connected between said third set of auxiliary windings and ground.

The expression "coupled" used is intended to cover the possibility of an indirect electrical connection between two elements. There may thus be one or more elements placed between two elements defined as being coupled to each other. The expression "connected" is on the other hand intended to mean a direct electrical connection of two entities to each other without any entity between them.

The invention has a number of advantages. It provides fast handling of faults such as pole-to-ground faults and single-phase-to ground faults. These faults can be handled in symmetrical monopole, unsymmetrical monopole and even bipole systems. These faults are furthermore taken care of with a limited number of additional elements, since an auxiliary set of windings is normally provided for providing auxiliary power supply. The invention also allows the size of other optional limitation elements to be reduced.

BRIEF DESCRIPTION OF THE DRAWINGS

The present invention will in the following be described with reference being made to the accompanying drawings, where FIG. 1 schematically shows a first variation of an interface arrangement according to the invention between an AC system and a first type of DC system, FIG. 2 schematically shows a second variation of an interface arrangement according to the invention between an AC system and a second type of DC system, FIG. 3 schematically shows a first variation of a controllable short-circuiting device for use in an interface arrangement, and FIG. 4 schematically shows a second variation of a controllable short-circuiting device for use in an interface arrangement.

DETAILED DESCRIPTION OF THE INVENTION

In the following, embodiments of the invention will be described.

The present invention is directed towards providing an arrangement for interfacing a Direct Current (DC) system with an Alternating Current (AC) system, which systems may both be power transmission systems. The DC system can for instance be a High Voltage Direct Current (HVDC) power transmission system and the AC system may be a Flexible Alternating Current Transmission System (FACTS). However these types of systems are mere examples of such systems and should not be considered as a requirement. The invention can also be applied in for instance power distribution systems.

Figure 1:
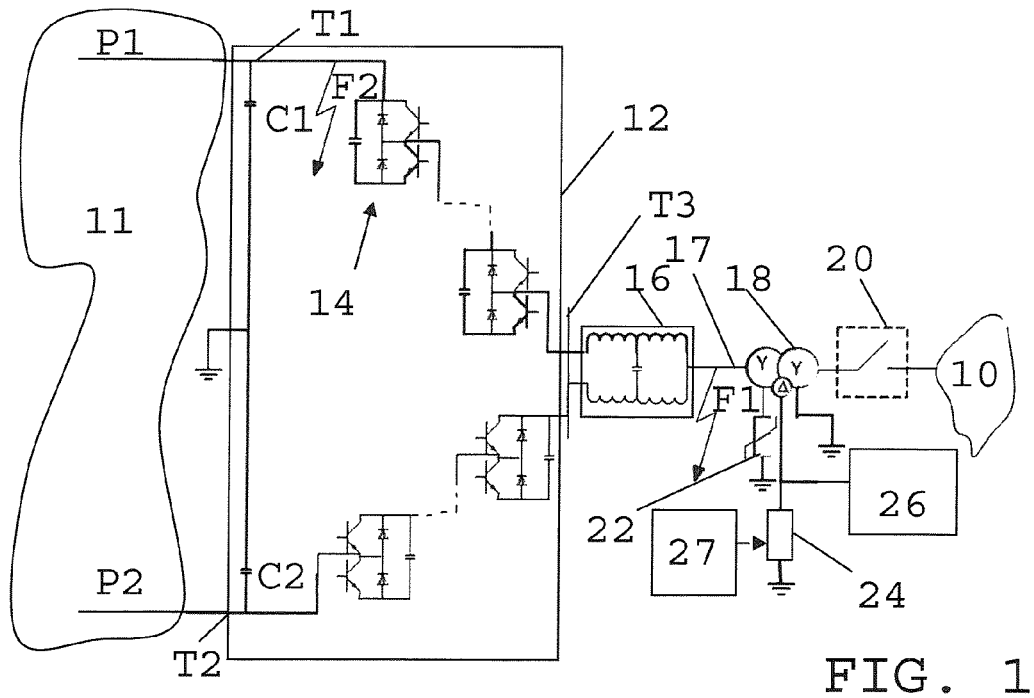

FIG. 1 schematically shows a single line diagram of an interface arrangement according to a first embodiment of the invention for connection between an AC system 10 and a DC system 11. The AC system 10 may be a three-phase AC system. The DC system 11 in turn includes two poles P1 and P2 that are coupled to the AC system 10 via the arrangement. In this embodiment the DC system 11 is a symmetrical monopole system.

In order to enable the DC system to be connected to the AC system 10, the arrangement includes a converter 12 for conversion between AC and DC. The converter 12 may function as a rectifier and/or inverter. The converter 12 may be a voltage source converter and in this embodiment it is a cell-based multilevel voltage source converter. Such a converter is typically made up of a number of cells 14 provided in phase arms of phase legs, where there is one phase leg per AC phase provided in parallel between the DC poles P1 and P2, where the connection point between such a phase leg and a first pole P1 of the DC system provides a first DC terminal T1 and the connection point between phase leg and a second pole P2 of the DC system provides a second DC terminal T2. Each phase leg comprises two phase arms. There is, in a phase leg an upper phase arm leading from the first pole P1 to an AC terminal T3 of the converter and a lower phase arm leading from the second pole P2 to the AC terminal T3. The cells 14 in the phase leg are placed symmetrically around the AC terminal T3. The cells 14 are with advantage connected in cascade in the cell arms. There are typically three phase legs in the converter 12. However, since FIG. 1 is a single line diagram there is only one phase leg shown. It is furthermore only shown in a general fashion. For the same reason FIG. 1 only shows one AC terminal T3. However, the AC terminal T3 is provided in a group of terminals typically comprising three AC terminals, one for each phase leg.

Each cell 14 may be a half-bridge cell, made up of two series connected switching elements having a capacitor connected in parallel with both these elements. The switching elements are typically provided in the form of a semiconductor device of turn off-type, like an Insulated Gate Bipolar Transistor (IGBT), with anti-parallel diode. In this example the midpoint between two switching elements of a cell is connected to one end of the capacitor of a following cell. In this way the cells are connected in cascade in the two phase arms between the two poles P1 and P2. In this type of converter each cell provides a zero or a small voltage contribution that are combined for forming an AC voltage.

In this first embodiment there is provided a filter 16 between the cells of the upper phase arm and the lower phase arm. The filter 16 comprises first and second phase reactors, where a first end of the first reactor is connected to the upper arm and a first end of the second reactor is connected to the lower arm. There is also a capacitor connected between the midpoints of these reactors. The second ends of these two reactors are interconnected and also connected to an AC bus 17 or group of conductors.

The converter 12 thus has a DC side for connection to the DC system 11 and more particularly to at least one pole P1 and P2 of the DC system and an AC side for being coupled to the AC system 10.

The filter 16 may be provided for a number of different reasons. It may be used for removing circulating currents between the phase legs. It may be provided for removing zero sequence third harmonics having been added during the operation of the converter 12. The filter 16 may also be provided for removal of other harmonics from the AC voltage. In case no filter is desired at this location, then the capacitor may be removed. The filter is thus optional The DC system 11 of the first embodiment is a symmetrical monopole system. Because of this, the converter comprises a pair of capacitors C1 and C2 connected between the two poles P1, P2 and the midpoint between these capacitors C1 and C2 is grounded.

The arrangement also includes a transformer 18 having a primary side with a first set of primary windings for being coupled to the AC system 10 and a secondary side with a second set of secondary windings coupled to the AC side of the converter 12. In this first embodiment the secondary windings are more particularly connected to the filter 16 via the AC bus 17.

In the present example the bus 17 and AC system 10 are provided for transmissions of three phase AC voltages. For this reason the primary side of the transformer 18 includes three primary windings (not shown), which in this first embodiment are connected in a wye configuration. It should however be realized that it is also possible with a delta configuration. The primary side here furthermore has a neutral point, which is coupled to ground. The neutral point may be directly connected to ground, as shown in FIG. 1. However, it may also be coupled to ground via a limitation element such as via an impedance or via a surge arrestor. The primary side is furthermore connected to the AC system via a circuit breaker 20. As the AC system is a three-phase system the circuit breaker 20 typically comprises three circuit braking elements, one for each phase.

The secondary side of the transformer 18 also comprises three secondary windings (not shown) connected in a wye configuration. It should however be realized that it is also possible with a delta configuration. The second set of secondary windings may thus be connected either in delta or in wye configuration. If the secondary windings are connected in the wye configuration the central or neutral point of this connection may be coupled to ground via a limitation element, which in the first embodiment is in the form of a surge arrester 22.

Finally the transformer 18 comprises a third set of windings, which are auxiliary windings and also typically three. These windings are in this embodiment delta connected. The auxiliary windings are arranged for providing auxiliary power, for instance to a plant or converter station in which the interface arrangement is provided. This auxiliary power may be used for operating such things as cooling equipment for the plant. An auxiliary power supply system 26 being connected to the third set of windings is schematically shown in FIG. 1. The voltage level provided to this power supply is considerably lower than the output voltage level of the converter and therefore the third set of auxiliary windings have fewer turns than the second set of secondary windings. For this reason the turns ratio between the second set of primary windings and the third set of auxiliary windings may be at least 10:1.

There is also a controllable short-circuiting device 24 connected between the third set of auxiliary windings and ground. This device 24 is also connected in parallel with the auxiliary power supply system 26. The short-circuiting device 24 is a device set to be short-circuited when a DC pole to ground fault occurs or when a converter AC bus fault occurs, which will be described in more detail later. The device 24 is thus set to be connected the third set of windings to ground in the case of such a fault. The short-circuiting device is also dimensioned to be operable at the voltage levels of the third set of auxiliary windings.

There is in the first embodiment furthermore a fault detecting unit 27 configured to detect a first and a second fault F1 and F2 and controlling the short-circuiting device 24 based on the fault detection. For this reason the fault detecting unit 27 may be connected to the first and/or second pole P1 and P2 and/or to the AC bus 17 between converter 12 and the transformer 18.

Figure 2:
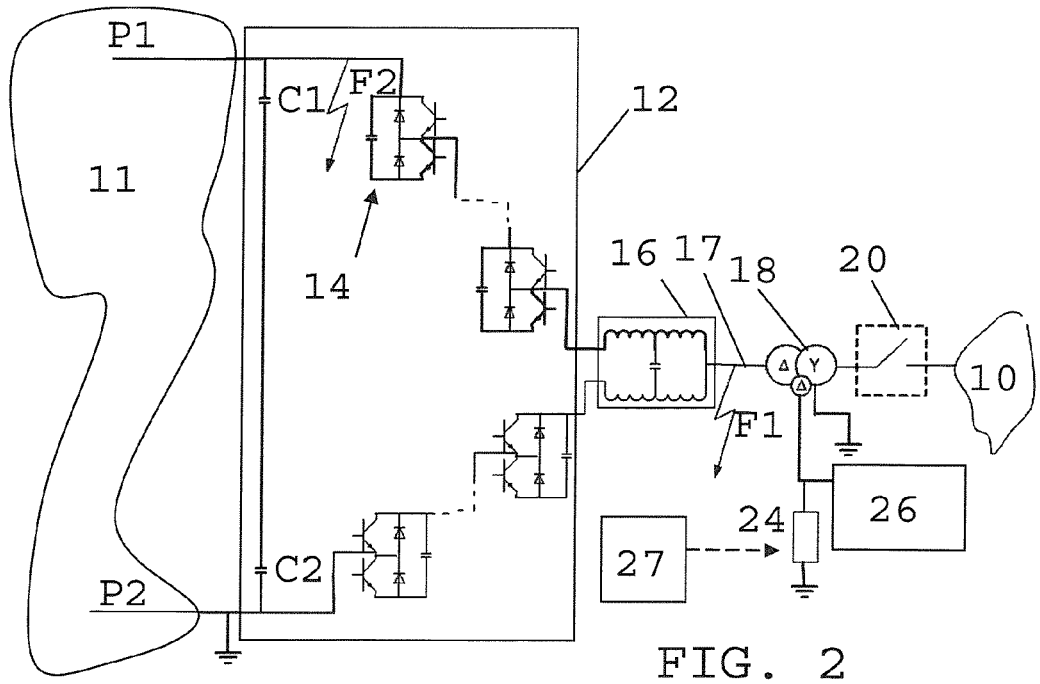

FIG. 2 shows a second embodiment of the interface arrangement, which is in many ways provided in the same way as in the first embodiment. One difference is that the DC system is an unsymmetrical monopole system, which leads to the second pole P2 being grounded instead of the midpoint between the two capacitors. Another difference is that the second set of windings of the secondary side of the transformer 18 is delta connected. Therefore there is no surge arrester either. In all other respect the interface arrangement according to the second embodiment is the same as in the first embodiment. Since the unsymmetrical monopole system is the basis for forming a bipole system, it should also be realized that the interface arrangement of the invention can also be used also with such a bipole system.

Figure 3:
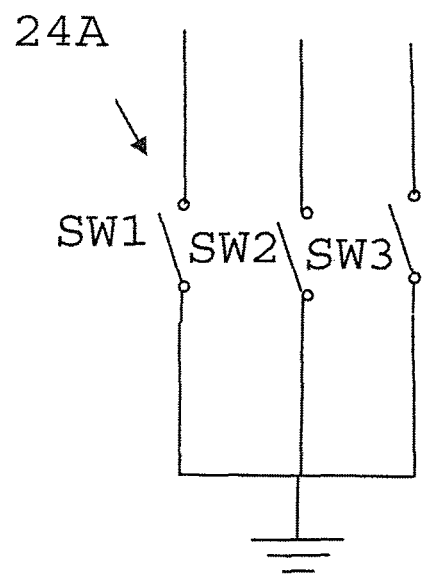

FIG. 3 shows one possible realization of the short-circuiting device. In this realization the short-circuiting device is a medium voltage high speed switch 24A. The switch 24A typically comprises one switching element SW1, SW2 and SW3 per phase. There is thus one switching element connected between a corresponding winding in the third set of windings and ground. The switch is typically a switch with a response time faster than 40 ms. It will thus react within 40 ms from being activated for being closed. The switch 24A is furthermore typically a mechanical switch dimensioned for the voltage levels used at the third set of auxiliary windings.

Figure 4:
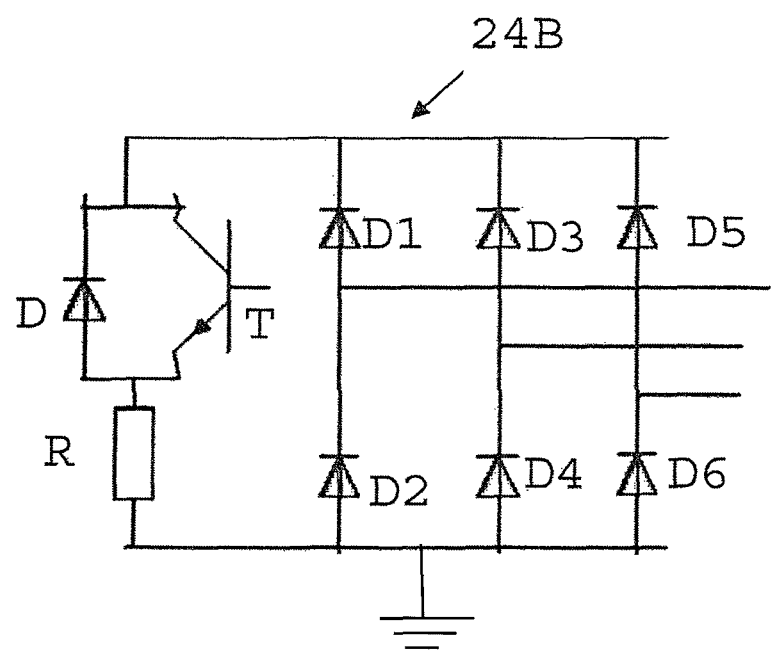

A second variation of the short-circuiting device is shown in FIG. 4. Here the short-circuiting device is an electronic switching device in the form of an active crowbar 24B, i.e. in the form of a diode bridge having a number of parallel bridge legs. There are in this case three bridge legs, one for each winding of the third set of auxiliary windings. There is here a first leg comprising a first and a second diode D1 and D2, a second leg comprising a third and a fourth diode D3 and D4 and a third leg comprising a fifth and a sixth diode D5 and D6, where the diodes of the phase legs all have the same orientation. The midpoint of each bridge leg is connected to a corresponding winding in the third set of auxiliary windings. The two ends of each leg are furthermore interconnected via a switch in series with a resistor R, where the switch comprises a semiconductor element T with antiparallel diode D. The semiconductor element may here be of both turn-on and turn-off type and may thus also here be an IGBT. At least the closing of the switch is thus provided through supplying a control signal from the fault detecting unit. The switch may as an alternative be provided as a thyristor.

A third possible variation of the short-circuiting device 24 is an air gap, which is set or dimensioned to get short-circuited at a certain voltage across the gap. As the air gap is also connected to the third set of windings of the transformer it is clear that the voltage will have a dependency on voltage changes at the other sets of transformer windings and thus also at the second set of windings. It can therefore be seen that the air gap may be dimensioned for being short-circuited depending on the voltage of the AC bus 17 and the turns ratio between the second and third set of windings, which voltage may be an AC bus fault overvoltage. When an air gap is used it is possible to omit the fault detecting unit 27.

The present invention is provided for handling faults in the interface arrangement like the faults shown in FIG. 1 and FIG. 2. It is thus provided for handling converter faults like DC-pole-to-ground faults and AC bus faults like single-phase-to ground faults of the converter. A pole-to-ground-fault F2 will cause a high current via diodes of the converter 12. A single-phase-to-ground fault F1 occurring on one of the phases of the bus 17 will also cause overvoltages at the same bus 17. Such an overvoltage is however caused on the other phases.

In operation the cells of the converter are controlled, for instance using pulse width modulation (PWM), for obtaining an AC voltage at the AC bus 17. It is then possible that a fault of one of the previous described types occur.

The above-mentioned single-phase-to-ground fault F1, which thus occurs at between the converter side transformer 18 and converter AC terminal T3, has been identified as one of the most destructive overvoltages of a converter. For the symmetrical monopole converter the solution so far is to design the arrestor 22 with a low voltage and high energy handling capability so that it can clamp the neutral point voltage low. This type of surge arrester is very costly. It will also occupy a large space of the converter station. For the unsymmetrical monopole, no reliable solution has been found yet.

The DC pole-to-ground fault F2 may, as was mentioned earlier, cause very large currents to flow in the diodes of the converter cells 14. This will typically happen during the time when the AC breaker 20 which connects the converter station to the AC system 10 is not open.

On way to limit such currents could be to provide a three phase AC breaker between AC bus 17 and ground, and close this breaker once the DC pole-to-ground fault F2 is detected. However, such a breaker would have to be dimensioned for the high voltage levels provided by the converter 12. These voltage levels may be very high and therefore the breaker is often of an expensive design. It would also be very large physically.

As can be seen above, these faults can cause extremely high voltages or current stresses on the semiconductors used in the converter. They may sometimes also lead to an DC offset in the AC current of a significant size. Such a DC offset may cause the main AC breaker 20 between converter 12 and AC system 10 to be unable to open due to lack of zero crossing.

The interface arrangement of the invention provides a common solution which can handle both these critical faults for both configurations in FIGS. 1 and 2.

This common solution is based on an understanding of the problem itself. The two faults, one causing the high voltage and the other causing the high current, exist during the time duration from the fault occurrence until the opening of the AC breaker 20. Once the AC breaker 20 is open, the AC source voltage is isolated from the converter 12 and thereby the eventual source for the high voltage/high current is disconnected. Unfortunately, the AC circuit breaker 20 normally takes about 40 ms to open if there is a condition for opening, where a condition typically is the existence of a zero-crossing in the current. If there are no such zero-crossings, the opening may take much longer time than 40 ms.

Instead of focusing only on the isolating of AC source, i.e. the converter 12, using the AC breaker 20, the invention proposes minimizing the "power" of AC source or by-passing of the "power" of the AC source.

In the transformer 18 normally the third set of windings will have an output voltage around 20 kV for the station auxiliary power supply 26. According to the invention once a fault occurs F1 and/or F2 is detected, for instance by the fault detecting unit 27, the short-circuiting device 24 will be ordered to close or closes itself so that it creates a short-circuit of the third set of windings. When this short-circuit is formed, the voltage between the converter 12 and transformer 18 will be largely decreased, i.e. the voltage on the secondary side of the transformer. This leads to a lowering of the high voltage on the phase arms. The short-circuiting also makes the current flowing through the main AC breaker 20 symmetrical so that it can be opened in time.

Thus, when such a fault occurs it is necessary to disconnect the DC system 11 from the AC system 10, which is not possible to perform directly because of the need to await a zero-crossing of the fault current. The fault detecting unit 27, when detecting a fault therefore first controls the short-circuiting device 24 to short-circuit the third set of auxiliary windings of the transformer 18, which is done fast within 40 ms. This activity limits the current levels through the AC breaker 20 and thereby zero-crossings are obtained, which enables the opening of the circuit breaker 20.

The invention has as number of advantages. It provides fast handling of pole-to-ground faults and single-phase-to ground faults. These faults can be handled in symmetrical monopole, unsymmetrical monopole and even bipole systems. These faults are furthermore taken care of with a limited number of additional elements, since an auxiliary set of windings is normally provided for use as a power supply. In the case of a switch, this is also done with an economic and simple realization, especially as compared with the previously mentioned circuit breaker between AC bus and ground. The crowbar may be more robust for a long run point of view. Since it is electronic, it is furthermore very fast. If a surge arrester is connected to the transformer, this surge arrester may be reduced in size and consequently also in cost, since the requirement on its energy capacity may be largely reduced because of the short-circuiting device.

Although the main advantages of the invention are to be found in handling faults for cell based converters, it should be realized that the inventive concept can also be used with other types, such as two- or three-level voltage source converters. The invention may in fact also be used with current source converters. The cells are furthermore not limited to half-bridge cells, but may as an alternative be full-bridge cells.

If the fault detecting unit is used, it is possible that this only detects one of the faults. This may be combined with the provision of a further fault detecting unit configured to detect the other fault. Both these units may control the short-circuiting device. Furthermore with the use of an air gap the interface arrangement may be provided without the use of fault detecting unit.

The second set of secondary windings may be connected in delta or wye configuration in a symmetrical monopole system. This means that it is possible to choose either a delta or a wye configuration of the second set of secondary windings for a symmetrical monopole system. However, in unsymmetrical monopole or bipole systems only the delta configuration is possible.

The fault detecting unit may be provided as a comparator connected to a measurement unit, such as a current or voltage transformer, where the comparator compares the measured quantity with a fault threshold and generates a switching signal based on the comparison. The comparing functionality may also be implemented through a computer or a processor with computer program memory including computer program code instructions causing the computer or processor to perform comparison when being run.

From the foregoing description of different variations of the present invention, it should be realized that it is only to be limited by the following claims.

The invention claimed is:

1. An interface arrangement for coupling between an AC system and a DC system and comprising
   a converter for conversion between AC and DC, said converter having a DC side with a first and a second terminal for connection to said DC system and an AC side with a group of terminals for being coupled to said AC system,
   a transformer having a primary side with a first set of primary windings for being coupled to said AC system and a secondary side with a second set of secondary windings coupled to said converter, said transformer being equipped with a third set of auxiliary windings,
   a short-circuiting device connected between said third set of auxiliary windings and ground, wherein the short-circuiting device comprises a short-circuiting switch, and
   a fault detecting unit configured to detect a fault on one of the converter terminals and activate the short-circuiting device for short-circuiting the third set of auxiliary windings.

2. The arrangement according to claim 1, wherein the third set of auxiliary windings has fewer turns than the second set of secondary windings.

3. The arrangement according to claim 2, wherein the turns ratio between the second set of secondary windings and the third set of auxiliary windings is at least 10:1.

4. The arrangement according to claim 1, wherein the short-circuiting device is configured to perform a short-circuiting within 40 ms after being activated.

5. The arrangement according to claim 1, wherein the short-circuiting device is connected to the third set of auxiliary windings in parallel with an auxiliary power supply system.

6. The arrangement according to claim 1, wherein the short-circuiting device is dimensioned to be operable at the voltage levels of the third set of auxiliary windings.

7. The arrangement according to claim 1, wherein the fault detecting unit is configured to detect a pole-to-ground fault on one of the DC terminals.

8. The arrangement according to claim 1, wherein the fault detecting unit is configured to detect a single-phase-to-ground fault on the group of terminals.

9. The arrangement according to claim 7, further comprising a further fault detecting unit configured to detect a single-phase-to ground fault on the group of terminals.

10. The arrangement according to claim 1, further comprising a circuit breaker between the primary side of the transformer and the AC system.

11. The arrangement according to claim 1, wherein the short-circuiting device is a high-speed switch.

12. The arrangement according to claim 1, wherein the short-circuiting device is an active crowbar.

13. The arrangement according to claim 1, wherein the converter is a voltage source converter.

14. The arrangement according to claim 13, wherein the voltage source converter is a cell-based multilevel voltage source converter.

15. The arrangement according to claim 1, wherein the converter is a current source converter.

16. The arrangement according to claim 2, wherein the short-circuiting device is configured to perform a short-circuiting within 40 ms after being activated.

17. The arrangement according to claim 3, wherein the short-circuiting device is configured to perform a short-circuiting within 40 ms after being activated.

18. The arrangement according to claim 2, wherein the short-circuiting device is connected to the third set of auxiliary windings in parallel with an auxiliary power supply system.

19. The arrangement according to claim 3, wherein the short-circuiting device is connected to the third set of auxiliary windings in parallel with an auxiliary power supply system.

20. The arrangement according to claim 4, wherein the short-circuiting device is connected to the third set of auxiliary windings in parallel with an auxiliary power supply system.

21. The arrangement according to claim 4, wherein the third set of auxiliary windings is separate from the ground by the short-circuiting device.

22. The arrangement according to claim 4, wherein the fault detecting unit is configured to detect a pole-to-ground fault or a single-phase-to ground fault.

\* \* \* \* \*